2,817,894

SOLDERING FLUX COMPOSITION AND METHOD OF SOLDERING WITH SAME

Morris A. Steinberg, University Heights, Ohio, assignor to Horizons Incorporated, Princeton, N. J., a corporation of New Jersey No Drawing. Application August 16, 1956
Serial No. 604,318

4 Claims. (Cl. 29—495)

This invention relates to a soldering flux. More particularly, it relates to a composition useful in joining members formed of aluminum or aluminum base alloys to one another with the formation of a joint which is characterized by a significantly greater corrosion resistance than has been heretofore attainable.

The fabrication of metal structures by joining members of aluminum and of alloys consisting primarily of aluminum to one another is complicated by a phenomenon which is characteristic of aluminum and aluminum base alloys, namely, the formation of a thin and almost invisible coating of oxide which forms on the members as a result of exposure to the ordinary atmosphere or any other oxidizing environment. The removal of this oxide is considered to be essential prior to joining and a number of methods are known in the art for accomplishing the necessary removal, including: treatment chemically by acids or alkalies; treatment physically by scratching, sandblasting or abrading; and treatment by various compositions which flux, melt, dissolve or otherwise remove the oxide from the members to be joined. This invention is concerned with compositions of the latter type.

Fluxes for removing the superficial film of oxide fall into different classes depending on whether the joining is to be accomplished by welding, brazing or soldering. Welding or brazing are carried out at temperatures in the region of the melting point of one or both of the members being joined and the flux employed is required to possess stability and chemical activity at these elevated temperatures. For soldering, much lower temperatures are used and the flux composition must be one which is fluid at the lower temperatures and which possesses the necessary chemical activity or dissolving power to perform the desired removal of oxide. Because the temperatures for soldering differ so greatly from those encountered when brazing or welding, entirely different types of fluxes are required to accomplish the latter.

One type of flux which has been employed successfully for joining aluminum members in the past depends for its utility on the removal of the film of aluminum oxide by reaction or solution in one portion of the flux and the deposition of a "tinning" metal on the freshly exposed aluminum surface by reaction between the aluminum and another portion of the flux composition. Such fluxes are known as reaction type fluxes and include at least one compound of a metal which can be displaced from its compounds by the aluminum. Compounds of zinc, cadmium, tin, lead, antimony and bismuth, particularly their halides, are commonly employed as the reactive component of such fluxes.

Among the prior art reaction type fluxes developed for joining light metals are those described in United States Patents 2,299,164; 2,299,165; 2,229,166; 2,299,167 and 2,299,168 which issued October 20, 1942. The fluxes disclosed in these patents are based on a carrier or vehicle composed of any two or more of the chlorides of sodium, potassium and lithium together with minor amounts of fluorides and limited amounts of one or more halides of the metals below aluminum in the electromotive series. As disclosed in the patents, these fluxes are intended to be used with a brazing filler metal and are substantially different from the flux invented by me in both composition and the manner in which they are used. My flux is characterized by the absence of any halides other than the chloride and by the presence of only a minor amount of alkali metal chlorides, proportioned so as to produce a composition having a melting point well below 500° C.

Another prior art flux is described in United States Patent 1,293,823 issued to George P. Luckey February 11, 1919. The specific flux therein described is formed by combining 65% of zinc chloride and 10% of ammonium chloride with 25% of a fused mixture of potassium chloride and sodium chloride in which the proportions of KCl:NaCl are those of their eutectic composition. The patentee also suggests that one or more of the chlorides of lithium, cadmium, copper, calcium, zinc, lead of ammonium may be combined with the eutectic mixture of KCl and NaCl.

I have found that the joints produced by use of such prior art fluxes are more susceptible to failure in moist atmospheres than is desirable in present day applications in which equipment fabricated of aluminum or aluminum alloys is intended to run for extended periods of time, hardly contemplated when such prior art fluxes were developed. I have further found that the incorporation of small but nonetheless significant amounts of nickel chloride in the flux about to be described results in joints which are appreciably less susceptible to failure by such corrosive attack. While I do not wish to be bound by any particular theory, I believe that the nickel component of my flux reacts with the base metal and that a nickel-containing aluminum alloy constitutes the resulting joint metal, which alloy has an enhanced corrosion resistance.

Flux compositions comprehended within my invention contain (1) about 10 parts by weight of the alkali metal chlorides as follows:

| | | |
|---|---|---|
| LiCl | 40–75 mol percent or | 29–66 weight percent |
| NaCl | 5–25 mol percent or | 6–29 weight percent |
| KCl | 15–40 mol percent or | 21–43 weight percent |

(2) about 84–95 parts by weight of zinc chloride, and (3) about 1 part by weight of nickel chloride.

In a more preferred composition, the chlorides are proportioned as follows:

1 part by weight NaCl  
3.6 parts by weight KCl     Total about 10 parts by weight  
5.4 parts by weight LiCl  
90 parts by weight $ZnCl_2$  
1 part by weight $NiCl_2$  
\_\_\_\_\_  
101.0

With fluxes coming within the compositions I have specified, no additional solder has been found to be necessary to achieve joints which are resistant to mechanical failure or chemical attack when bonding aluminum or its alloys to other members of aluminum or aluminum base alloys or to copper.

The following example is illustrative of the joining of copper to aluminum (2S alloy), but is not to be taken as limitative.

A mixture of 10 parts by weight of NaCl, 36 parts by weight of KCl, 54 parts by weight of LiCl, 900 parts by weight of $ZnCl_2$ and 10 parts by weight of $NiCl_2$ was prepared by blending the ingredients in the dry state. Temporary T-shaped assemblies and butt joints were formed by clamping light gauge aluminum, aluminum alloys (2S) and copper plates to 2S aluminum plates, distributing the flux composition along the intersection of the two legs of the T or along the areas butted, and heating to about 725° F., for about one minute after the composition had melted. The joints so formed were permitted to cool and were then rinsed in warm water. The resulting members were tested for resistance to corrosion by placing an initial load of 1000 p. s. i. on the joint immersed in boiling water. The results were as follows:

| | |
|---|---|
| Alcoa flux, 803 solder | <22 hours before failure |
| Kester cored solder | <15 hours before failure |
| 10(LiCl—KCl—NaCl)+90 (ZnCl$_2$) | 360 hours before failure |
| 10(LiCl—KCl—NaCl)+90 (ZnCl$_2$)+1(NiCl$_2$) | >900 hours before failure |

Thus it may be seen that in an environment of boiling tap water, the addition of nickel chloride to the composition disclosed in a copending application Serial No. 604,336 filed of even date herewith substantially increased the life of the joint.

I claim:

1. A soldering flux composition consisting essentially of 10 parts by weight of a mixture of alkali metal chlorides in which the relative weight proportions of the constituents are: LiCl between 29% and 66%, NaCl between 6% and 29%, and KCl between 21% and 43%; 90 parts by weight of zinc chloride and 1 part by weight of nickel chloride.

2. The composition of claim 1 in which the alkali metal chloride portion consists of 54% LiCl, 36% KCl and 10% NaCl by weight.

3. The composition of claim 1 in which the alkali metal chloride portion consists of a previously fused mixture of LiCl, KCl and NaCl.

4. The method of increasing the corrosion resistance of a soldered joint between at least two metallic members, at least one of which is aluminum, which comprises: assembling said members to form a joint, applying to said joint a reactive flux consisting of the following ingredients by weight: between 2.9 and 6.6 parts by weight LiCl, between 2.1 and 4.3 parts by weight KCl, between 0.6 and 2.9 parts by weight NaCl, the total weight of these alkali metal chlorides being about 10 parts by weight, between 84 and 95 parts by weight ZnCl$_2$ and about 1 part by weight of NiCl$_2$; heating the flux and joint to melt the flux and to permit the molten flux to react with the base metal; permitting the assembled joint to cool and removing excess salts from the joint area by rinsing.

References Cited in the file of this patent

UNITED STATES PATENTS

| | | |
|---|---|---|
| 2,179,258 | Howarth | Nov. 7, 1949 |
| 2,723,929 | Fisher et al. | Nov. 15, 1955 |